April 13, 1926.
G. W. LANMAN
SCALE BEAM
Filed June 5, 1925
1,581,070
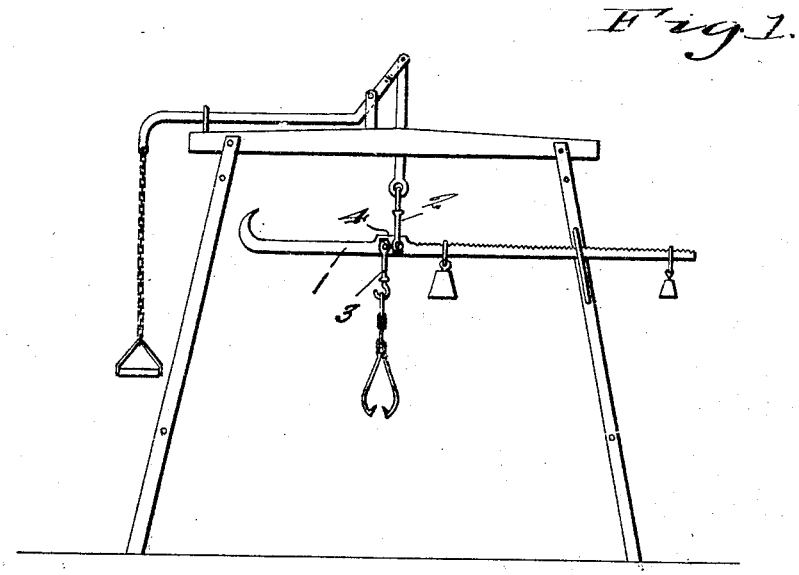
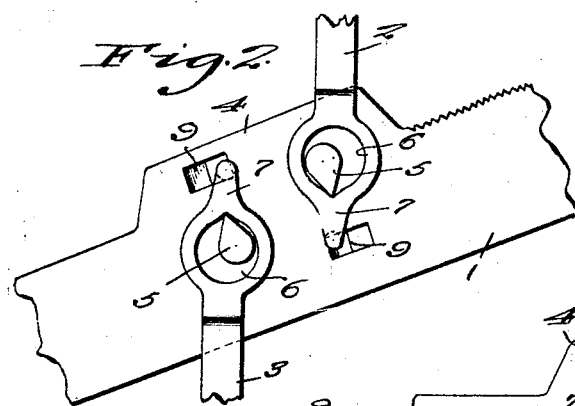
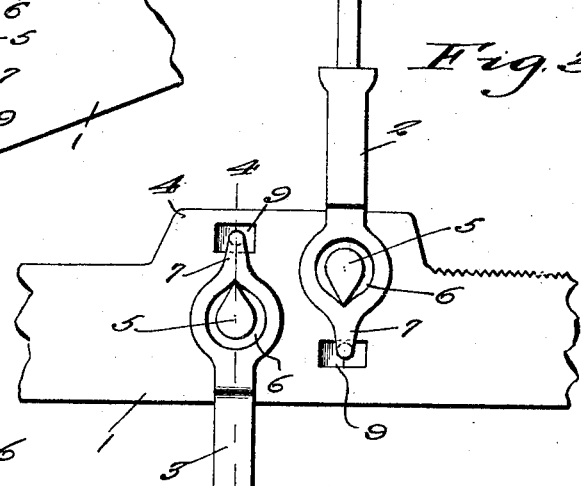
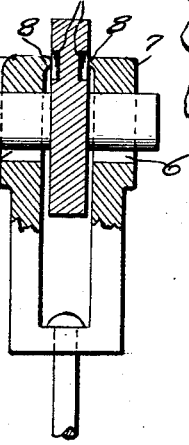
G. W. Lanman
INVENTOR
BY Victor J. Evans
ATTORNEY Patented Apr. 13, 1926.

1,581,070

UNITED STATES PATENT OFFICE.

GEORGE W. LANMAN, OF TEXAS CITY, TEXAS.

SCALEBEAM.

Application filed June 5, 1925. Serial No. 35,188.

*To all whom it may concern:*

Be it known that I, GEORGE W. LANMAN, a citizen of the United States, residing at Texas City, in the county of Galveston and State of Texas, have invented new and useful Improvements in Scalebeams, of which the following is a specification.

In the ordinary construction of beam scales, the beam, under the weight of the load thereon, is liable to tilt or cant so that there is a frictional engagement between the hangers and the beam, and as a consequence, the weighing by the scale is not at all times accurate. It may, therefore, be considered the primary object of this invention to construct a beam scale in such a manner that no friction will be occasioned between the stirrup hangers and the beam of the scale when the beam is arranged in counter-balancing position with respect to the weight thereon.

To the attainment of the above broadly stated objects and others which will appear as the nature of the invention is better understood, reference is to be had to the drawings which accompany and form part of this application.

In the drawings:—

Figure 1 is a side elevation of a beam scale provided with the improvement.

Figure 2 is a fragmentary elevation to illustrate the arrangement of the beam when the beam is canted to receive a load.

Figure 3 is a similar view but showing the beam in a horizontal position, as when the weight has been adjusted to counter-balance the weight of the load on the beam.

Figure 4 is a sectional view on the line 4—4 of Figure 3.

In Figure 1 of the drawings, I have illustrated the improvement in connection with a cotton weighing beam scale, but, of course, it is to be stated that the invention is susceptible to application upon other types of beam scales.

The beam of the scale is indicated by the numeral 1. The hanger that supports the beam on the frame of the scale is indicated by the numeral 2 and the hanger to which the load to be weighed is attached, is indicated by the numeral 3. Both of the hangers are of similar construction except that the same are reversely arranged. The upper edge of the beam, at the portions thereof over which the arms of the U-shaped hangers are arranged, is widened, as at 4. The pear-shaped trunnions for the stirrups are both indicated by the numerals 5, and each of the hangers has its arms provided with pear-shaped openings 6 for the reception of the trunnions. This, of course, is of the usual construction.

The side members of the hangers, beyond the eye portions thereof, that is the portions provided with the openings 6, are formed with extending fingers 7, and each of these fingers has its upper and inner corner formed with a projecting lug 8. The sides of the beam 1, directly opposite the inwardly directed lugs 8 are formed with depressions 9, the said depressions having their side walls beveled, to the centers thereof. The lugs 8 are slightly received in these depressions. The lugs traveling on the inclined walls provided by the depressions will hold the beam 1 central between the hangers when the beam is tilted to receive a load thereon, as disclosed in Figure 2 of the drawings. The lugs are arranged opposite the center and therefore the deeper portions of the depressions when the weight on the beam balances the load carried thereby, as disclosed in Figures 3 and 4 of the drawings. Thus there is no frictional engagement between the sides of the hangers and the beam with the result that the load on the beam can be accurately weighed.

The simplicity and advantages of the invention will be readily apparent to those skilled in the art to which such inventions relate, and therefore a further detailed description is not believed necessary.

Having described the invention, I claim:—

1. A beam scale having hangers for supporting the beam and for supporting the load carried by the beam, each of said hangers having pear-shaped eyes to receive pear-shaped trunnions on the sides of the beam and the said hangers having fingers extending beyond the eyes, each of said fingers having an inwardly directed lug and the sides of the beam being formed with depressions disposed directly opposite said lugs.

2. A beam scale having hangers for supporting the beam and for supporting the load carried by the beam, each of said hangers having pear-shaped eyes to receive pear-shaped trunnions on the sides of the beam and the said hangers having fingers extending beyond the eyes, each of said fingers having an inwardly directed lug and the sides of the beam being formed with depressions disposed directly opposite said lugs, and said depressions having their walls beveled inwardly to the center thereof.

In testimony whereof I affix my signature.

GEORGE W. LANMAN.